Dec. 17, 1968 G. T. SINCERBOX 3,417,381

APPARATUS FOR WRITING INFORMATION IN MEMORY BY LIGHT

Filed June 21, 1965

INVENTOR
GLENN T. SINCERBOX

BY Ralph C. Dastin

ATTORNEY

United States Patent Office 3,417,381

Patented Dec. 17, 1968

3,417,381

APPARATUS FOR WRITING INFORMATION IN MEMORY BY LIGHT

Glenn T. Sincerbox, Wappingers Falls, N.Y., assignor to International Business Machines Corporation, Armonk, N.Y., a corporation of New York Filed June 21, 1965, Ser. No. 465,527
5 Claims. (Cl. 340—173)

This invention relates to apparatus for writing information into a memory by means of light, and more particularly to apparatus for forming a mask through which light may be passed to a memory for writing information simultaneously at a plurality of locations.

There is described in a United States patents application, Ser. No. 332,755, filed Dec. 23, 1963, by Harold Fleisher et al., an apparatus for producing thin layers of reflecting material in a transparent film as a representation of information. The layers are formed by directing light through a photographically sensitive emulsion and reflecting the same light back through the emulsion at a given location. A standing wave is set up for each monochromatic light frequency, and the emulsion is modified at the antinodes of the standing waves to produce light scattering layers spaced in depth at periodic intervals for each frequency present.

When light is directed against a film in which reflecting layers had previously been formed, a coherent reflective scattering of the light is obtained if it is of the same frequency as that which resulted in the original formation of the layers. Light at other frequencies will not be coherently reflected. Such light is reflected incoherently from each of the many partially reflecting layers, resulting in a considerably reduced intensity relative to the coherent reflected light of the recorded anharmonic frequencies in the storage area.

There may be over the surface of the film many locations at which individual bits of information are recorded, some represented by the deposit of reflecting layers corresponding to one light frequency and others represented by layers resulting from exposure to light of other frequencies. To obtain a deposit of reflecting layers at any location, an exposure of the emulsion to light at that location for a period of several seconds is required. This must be repeated for each of the frequencies to be stored at any given location. If the reflecting layers at the locations were formed serially by directing a light beam to the locations in serial fashion, then considerable time would be required to write information into the film at all locations.

It has been discovered that a mask may be formed from a photochromic film which becomes opaque when exposed to light of a high frequency, such as ultraviolet light, and becomes clear or transparent again when exposed to low frequency light, such as infrared. In forming a mask from such film, it is first exposed over its entire surface to ultraviolet light and then it is exposed to infrared light at locations where it is desired to pass light of a given frequency to a photographically sensitive emulsion. Exposure to infrared light for only a few microseconds is sufficient to change the film from dark to clear at any location and so only a comparatively short period of time is needed to form a mask even though the infrared light is directed to the different locations serially.

In a preferred form of the invention, a photochromic film is arranged in alignment with an emulsion in which information is to be stored at different locations. Apparatus is provided for exposing the film over its entire surface to ultraviolet light for rendering it opaque and then those locations through which light of a selected frequency is to be passed to the emulsion for storing information are subjected to infrared light. The apparatus includes means for preventing both the ultraviolet and infrared light from reaching the emulsion during the formation of the mask. Since the mask is in the same position relative to the emulsion during both the forming of the mask and the writing of information, no registration problems are encountered.

An object of this invention is to provide an improved apparatus for writing information into a photographic emulsion by means of light.

Another object is to provide means for forming a mask through which light may be passed to a photographic emulsion for storing information therein.

Yet another object is to provide a film in a fixed position relative to a light sensitive emulsion and from which a mask may be formed by light rays which are passed through the film but are prevented from reaching the emulsion. After the mask has been formed, light rays may be passed through it to the emulsion for writing information therein.

Still another object is to provide means for forming a mask from a light sensitive film which is in a fixed position relative to a photographic emulsion, the means being operable to prevent light from reaching the emulsion during formation of the mask and to pass light from the mask after the latter is formed so as to write information into the emulsion.

The foregoing and other objects, features and advantages of the present invention will be apparent from the following more particular description of the preferred embodiments of the invention, as illustrated in the accompanying drawings.

Figure 1:
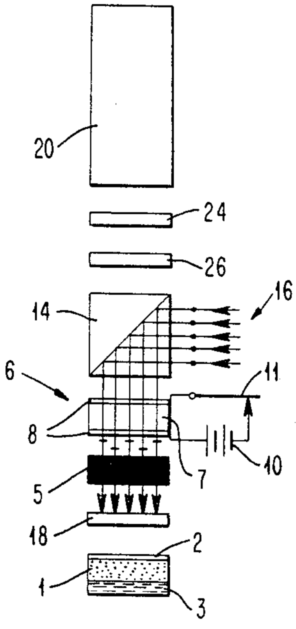
FIG. 1 is a schematic diagram of apparatus arranged for forming a mask through which light may be passed to a photographic emulsion for writing information therein, the apparatus being conditioned for causing the mask to become completely opaque.
Figure 2:
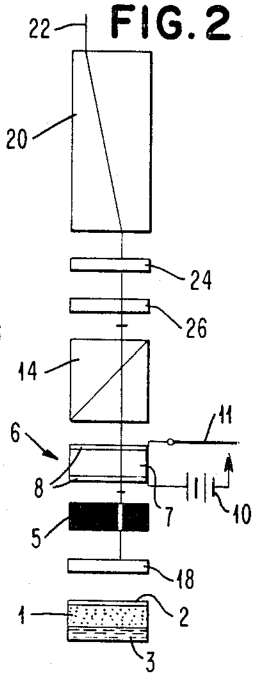
FIG. 2 is like FIG. 1 but shows the apparatus conditioned for making the mask transparent at locations through which light is to be passed to the emulsion.
Figure 3:
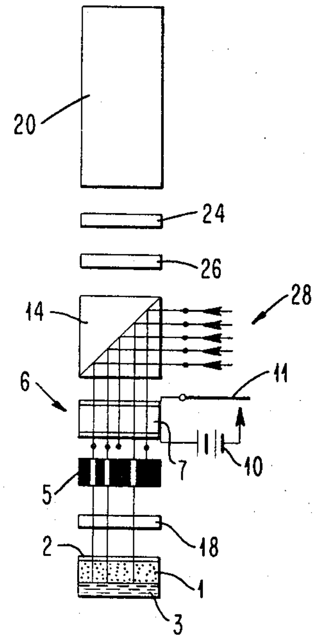
FIG. 3 is like FIGS. 1 and 2 but shows the apparatus conditioned for passing light through the mask to the photographic emulsion.

There is shown in FIGS. 1 to 3 an improved arrangement of mechanisms for directing light to a photographic emulsion 1 so as to effect the storage of information therein according to the technique described in the Fleisher et al. application mentioned above. The emulsion is arranged between a transparent glass plate 2 and a layer of mercury 3 so that light passing downwardly through the emulsion is reflected upwardly again by the mercury to form standing light waves which cause a material to be deposited in light reflecting layers at the antinodes of the waves. After the emulsion has been exposed to light, the mercury is removed and the emulsion is processed to form a film. Light may then be passed through the film to read information stored in the form of reflecting layers. Only light at the same frequencies as those which caused a deposit of material in reflecting layers is coherently reflected.

Arranged in a fixed position spaced a short distance above the emulsion is a plate 5 of a photochromic material such as a photochromic glass made by Corning Glass Co. This plate is normally transparent but turns dark when subjected to ultraviolet light and then becomes clear again when exposed to infrared. Visible light within a large range of frequencies has no effect upon the color of the plate. Arranged above plate 5 is an electro-optic device 6 comprising an electro-optic crystal 7, such as a potassium dihydrogen phosphate crystal, arranged between a pair of transparent electrodes 8. A circuit including a voltage source 10 and a switch 11 is connected to the electrodes 8. When the switch is open, a linearly polarized light beam may be passed through the electro-optic device without any change in the direction of polarization. With the switch closed, however, the voltage applied across the electrodes is such as to effect a rotation in the direction of polarization by 90 degrees.

Above, the electro-optic device is a beam splitter 14 through which light polarized in the plane of the drawing passes without deflection while light polarized perpendicular to the drawing is deflected 90 degrees. The plate 5 is first turned dark over its entire surface by directing ultraviolet light 16 from any source not shown to the beam splitter 14 polarized in a plane perpendicular to the drawing. This light is deflected downwardly by the beam splitter through the electro-optic device 6 and the plate 5. Between the plate 5 and the emulsion 1 is an analyzer 18 oriented to pass light polarized in a plane perpendicular to the drawing and to block all light polarized in the plane of the drawing. It is necessary that the ultraviolet light be blocked by the analyzer 18, otherwise it would cause a deposit of reflecting layers in the emulsion and it is desired that all of the material from which layers are formed be reserved for the storage of information. To render the analyzer effective for blocking ultraviolet light, the polarization of the light is rotated to the plane of the drawing by closing the switch 11 as shown.

With the plate 5 completely darkened, infrared light may now be passed through the plate at points where it is desired that light of a selected frequency be passed later to the emulsion for writing information therein. To direct a beam of infrared light to selected points on the plate 5, there is provided above the beam splitter 14 a digital light deflector 20 which may be like that shown and described in patent application Ser. No. 285,832, filed June 5, 1963, by T. J. Harris et al. A beam 22 of linearly polarized infrared light may be directed by the deflector 20 to any one of many points at its output end. The direction of polarization at the output end may be perpendicular to the drawing at some points and parallel to the drawing at other points. In order that this light may pass through the beam splitter 14 without deflection, it is necessary that the light be polarized parallel to the drawings at all points. To assure a polarization in this direction, a quarter wave plate 24 is located at the output end of the deflector for changing the polarization from plane to circular. The light then passes through a polarizer 26 which changes it again to a polarization in the plane of the drawing. This light passes straight through the beam splitter to the electro-optic device 6 which is made inactive by the opening of switch 11. The light, still polarized in the plane of the drawing, passes through plate 5 and turns it clear at that point as shown in FIG. 2. Analyzer 18 also prevents the passage of the infrared light to the emulsion. The deflector 20 is operated to deflect the light beam 22 to each of the points on the plate 5 at which it is desired to pass light of a selected frequency to the emulsion. After the plate 5 has been made clear or transparent at all of the points to which the infrared light beam was directed, information is written into the emulsion at corresponding points by directing light 28 of the selected frequency through the beam splitter 14 as shown in FIG. 3. This light is linearly polarized in a plane perpendicular to the plane of the drawing so that it is deflected by the beam splitter through the electro-optic device 6 which is inactive since its switch 11 is open. From the electro-optic device the light passes through the areas on plate 5 cleared by the infrared light and, since the light remains polarized perpendicular to the plane of the drawing, it passes through the analyzer 18 to the emulsion 1 for effecting a formation of reflecting layers corresponding to the light frequency. Having written information into the emulsion at certain points for the selected light frequency, the plate 5 may now be darkened again over its entire surface by directing ultraviolet light through it as indicated by FIG. 1. Infrared light may then be directed to areas on the plate where information corresponding to a different light frequency is to be written in the emulsion. After these areas are cleared, light at the next frequency may be passed through the cleared areas of plate 5 to the emulsion. Some of these may be the same areas through which light at the first frequency was passed.

It will be understood that the procedure described above may be repeated as many times as is necessary to write into the emulsion all of the desired information. Since only a very brief exposure of the plate 5 to infrared light is needed to make it clear at any one area, then many areas could be cleared in a short period of time. Even though the exposure of the emulsion to light for several seconds may be required for effecting a deposit of reflecting layers, but little time is needed to write information at many locations since large portions of the information are written at many locations in parallel. Since all parts of the system remain in fixed positions and the mask plate 5 is changed only by directing different types of light to it, no problems in registration are encountered.

Figure 4:
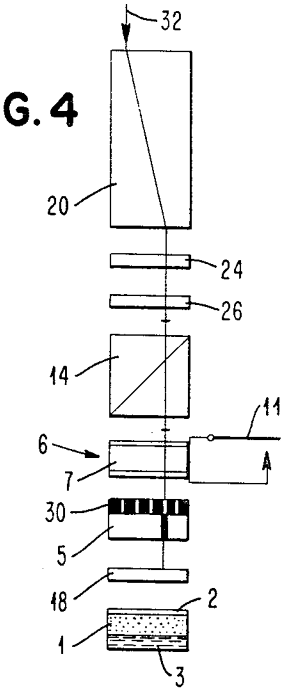
FIG. 4 is a modification of FIGS. 1 to 3 and shows apparatus conditioned for making the mask opaque at locations opposite those in the emulsion where no information is to be stored.
Figure 5:
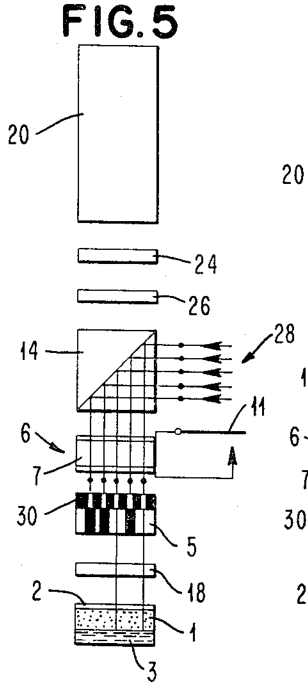
FIG. 5 is like FIG. 4 but shows the apparatus conditioned for passing light to the emulsion through areas of the mask remaining transparent after conditioning in FIG. 4.
Figure 6:
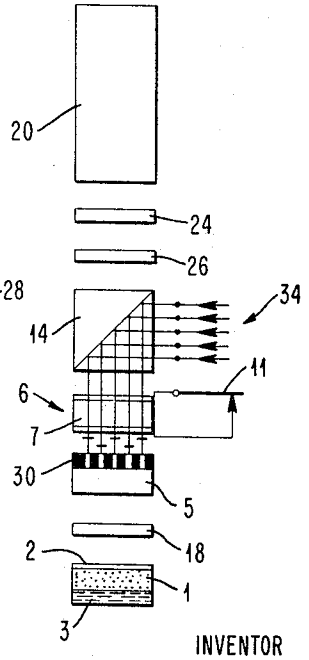
FIG. 6 is like FIGS. 4 and 5 but shows the apparatus conditioned for restoring the mask to its original state.

FIGS. 4 to 6 show a system like that of FIGS. 1 to 3 except that the plate 5 has at its upper side a mask 30 which passes light only at locations corresponding to those on the film 1 where information may be recorded. If light of a selected frequency is to be passed to the emulsion at something less than all of the locations, then an ultraviolet light beam 32 is first directed by the deflector 20 to openings in the mask 30 where no recording of information is desired. This light acts to darken the plate 5 below the opening so that light of the selected frequency cannot be passed through later. The light received from the deflector is polarized in the plane of the drawing and is not changed by the electro-optic device 6 since the switch 11 is left open. Light polarized in this plane is blocked by the analyzer 18 as indicated in FIG. 4.

After the plate 5 has been darkened at all locations where no information is to be recorded, the light beam 28 of selected frequency is passed through areas not darkened to the emulsion 1. Having recorded information at this frequency, infrared light 34 is then passed through all openings in the mask 30 to effect a clearing of those areas which had previously been darkened. Switch 11 is closed at this time to polarize the light in such a direction that it is prevented from passing the analyzer 18. Ultraviolet light may then be directed by the deflector to those areas on the plate 5 which are to be darkened for preventing the passage of light at another frequency.

While there has been shown in this application one form and a modification which this invention may assume in practice, it will be understood that it may be modified and embodied in various other forms without departing from the spirit and scope of the appended claims.

What is claimed is:

1. Apparatus for writing information into memory comprising, in combination:

a photographic emulsion in which information may be written by exposing it to light, a normally transparent plate of photochromic material at the input side of said emulsion, said plate becoming opaque when exposed to ultraviolet light and transparent again when exposed to infrared light, an analyzer between said plate and said emulsion for blocking the flow of light to the latter except when it is polarized in a given direction, means for exposing said plate to ultraviolet light and infrared light in such a way that selected areas are transparent while the remaining areas are opaque, said ultraviolet and infrared light being polarized in a direction to be blocked by said analyzer, and means for exposing said plate to light at a selected frequency and polarized in a direction to pass through said analyzer to said photographic emulsion.

2. The apparatus of claim 1 including an electro-optic device at the input side of said photochromic plate for controlling the polarization of light delivered thereto.

3. Apparatus for writing information into memory comprising, in combination:

a photographic emulsion in which reflecting layers are formed when exposed to light, a normally transparent plate of photochromic material at the input side of said emulsion, said plate becoming opaque when exposed to ultraviolet light and transparent again when exposed to infrared, a mask at the input side of said plate passing light to the latter at only selected locations, an analyzer between said plate and said emulsion for blocking the flow of light to the latter except when polarized in a given direction, means for directing ultraviolet light to predetermined ones of said selected locations whereby said plate at such locations is made opaque, said ultraviolet light being polarized in a direction to be blocked by said analyzer, and means for directing to all of said locations light of a selected frequency and polarized in a direction to pass said analyzer, said light of selected frequency passing through all locations on said plate remaining transparent to said emulsion.

4. Apparatus for writing information into memory comprising, in combination:

a photographic emulsion in which reflecting layers are formed when exposed to light, a plate of photochromic material at the input side of said emulsion, said plate being darkened when exposed to ultraviolet light and cleared again when exposed to infrared light, an analyzer between said plate and said emulsion for blocking the flow of light to the latter except when it is linearly polarized in a given direction, means for exposing said plate over its entire surface to ultraviolet light polarized in a direction to be blocked by said analyzer, means for exposing selected locations on said plate to infrared light polarized in a direction to be blocked by said analyzer, and means for exposing the entire surface of said plate to light at a selected frequency within the visible range and polarized in a direction to pass through said analyzer to said photographic emulsion.

5. Apparatus for writing information in a memory responsive to light at different frequencies comprising, in combination:

a plate at one side of said memory made of a normally transparent material which becomes opaque when subjected to ultraviolet light, an analyzer located between said plate and said memory for blocking the flow of light to the latter except when it is polarized in a given direction, means for exposing areas on said plate corresponding to those on said memory where no information is to be written, to ultraviolet light, said light being polarized in a direction to be blocked by said analyzer, and means for exposing all areas on said plate to light of a selected frequency, said light of selected frequency being polarized in a direction to pass through said analyzer to said memory for recording information therein.

References Cited

UNITED STATES PATENTS 3,174,140 3/1965 Hagopian ---------- 340—174.1

TERRELL W. FEARS, *Primary Examiner.*

U.S. Cl. X.R.

346—74; 340—174.1; 96—1